United States Patent [19]
Kimura et al.

[11] Patent Number: 5,778,054
[45] Date of Patent: Jul. 7, 1998

[54] COMMUNICATION APPARATUS AND METHOD FOR DISPLAYING ON A SCREEN A NUMBER OF IMAGES CORRESPONDING TO RESPECTIVE ACCESS INFORMATION THAT IS OPERATIVE TO INITIATE ELECTRONIC COMMUNICATION

[75] Inventors: Yuji Kimura; Hisayoshi Moriwaki; Hiroyuki Yasui, all of Kanagawa, Japan

[73] Assignee: Sony Corporation, Tokyo, Japan

[21] Appl. No.: 685,090

[22] Filed: Jul. 23, 1996

[30] Foreign Application Priority Data

Jul. 24, 1995 [JP] Japan ................................. 7-187011

[51] Int. Cl.[6] ............................................. H04M 11/00
[52] U.S. Cl. ............................... 379/93.23; 379/92.01; 379/354
[58] Field of Search ........................... 379/90, 96–99, 379/354–357, 201, 93.17, 93.18, 93.23–93.25, 93.28, 93.37, 92.01; 348/14, 7

[56] References Cited

U.S. PATENT DOCUMENTS

| 4,862,498 | 8/1989 | Reed | 379/355 |
|---|---|---|---|
| 5,414,457 | 5/1995 | Kadowaki et al. | 379/96 |
| 5,461,667 | 10/1995 | Remillard | 379/96 |
| 5,568,546 | 10/1996 | Marutiak | 379/355 |

FOREIGN PATENT DOCUMENTS 2-113657 4/1990 Japan .......................... 379/53

Primary Examiner—Wing F. Chan
Attorney, Agent, or Firm—Frommer Lawrence & Haug LLP; William S. Frommer

[57] ABSTRACT

A communication terminal apparatus receives and stores access information and video information corresponding to the access information, the video information is retrieved from storage for display to a user, a selection of one video information is received from a user, and one access information corresponding to the one video information is retrieved from storage.

36 Claims, 8 Drawing Sheets

| Name | Tel. No. | E-mail address | Image No. |
|---|---|---|---|
| E-mail | 0123 - 4567 | | #0 |
| Kimura | 1234 - 5678 | kimura@patent.inventor.xyz | #1 |
| Moriwaki | 9876 - 5432 | moriwaki@patent.inventor.xyz | #2 |
| Yasui | 5678 - 1234 | yasui@patent.inventor.xyz | #3 |

COMMUNICATION APPARATUS AND METHOD FOR DISPLAYING ON A SCREEN A NUMBER OF IMAGES CORRESPONDING TO RESPECTIVE ACCESS INFORMATION THAT IS OPERATIVE TO INITIATE ELECTRONIC COMMUNICATION

BACKGROUND AND DESCRIPTION OF THE PRIOR ART

The invention relates to a teleconferencing device that transmits and receives audio and video information and to a telephone device for audio communication. More specifically, the invention relates to a telecommunication access device for displaying directory information which may include telephone numbers, electronic addresses, and other access information, and for initiating an electronic connection pursuant to such directory information.

Commonly, telephone directory information is available in printed publications or is preserved by a user in a written or printed form. Often, directory information such as telephone numbers, electronic addresses, and other access information take the form of lengthy, complex, non-intuitive sequences of alphanumeric characters. The prevalence of such sequences of numbers in telephone communications systems has created a need for simplifying the dialing process by which telephone communications are initiated. To simplify telephone number dialing, prior art telephones commonly include a number of speed-dial buttons or provide an abbreviated dialing function.

Telephone speed-dial buttons are typically implemented as a group of dedicated buttons provided on the telephone device near the keypad. Each button is associated with a telephone number stored in a memory device within the telephone. Upon activation of one of the speed-dial buttons, the telephone accesses the memory for the corresponding telephone number and transmits a corresponding sequence of dialing signals. Accommodation of numerous telephone numbers with corresponding speed-dial buttons on a telephone set significantly complicates the structure of the telephone set. In a practical implementation, the number of telephone numbers that can be accommodated will be limited by the size and layout of the speed-dial buttons and not the storage capacity of the memory.

Further, as the correspondence between particular speed-dial buttons and particular telephone numbers is easily forgotten by a user, an increase in the number of speed-dial buttons increases the potential for confusion and mistaken operation. Moreover, recollection of which speed-dial button corresponds to a particular telephone number can itself be a time consuming process.

In an abbreviated dialing function a user enters through a keypad a short number of digits to control the telephone to dial a longer telephone number. Often several long telephone numbers can be associated with corresponding short digit sequences and stored in a memory within the telephone. Upon entry of a short digit sequence, the telephone accesses the memory for the corresponding telephone number and transmits a corresponding sequence of dialing signals. As an example, a short digit sequence may comprise a sharp or pound key "#" followed by a two number key sequence. The number of telephone numbers that can be accommodated is limited by the number of digits in the short digit sequence.

An obvious disadvantage of the abbreviated dialing function is the lack of an intuitive relationship between the short digit sequence and the longer telephone number. As a consequence, both the short digit sequence and the longer telephone number are easily forgotten by a user. Since a considerable number of telephone numbers may be regularly utilized by a user, a written or printed directory setting forth the correspondence between short digit sequences and longer telephone numbers is often necessary.

In electronic communication systems, such as electronic mail (e-mail), addresses are utilized to identify participants in an electronic communication. In an e-mail system, it is customary to access the system through a software-controlled computer system. To create a message, a participant enters the address of the intended recipient of the mail along with the message. Typically, the address consists of a lengthy string of alphanumeric characters and complicated punctuation that must be precisely duplicated for correct mail transmission. As with telephone numbers, e-mail addresses are commonly complex and nonintuitive and, therefore, difficult for a user to remember. Consequently, written records, such as a directory book, are often needed by the user to record e-mail addresses and other identifying information regarding e-mail recipients.

OBJECTS AND SUMMARY OF THE INVENTION

Therefore, it is an object of the present invention to provide a communication terminal having a graphical user interface for displaying directory information, facilitating user selection of particular directory information, and initiating a communication pursuant to such directory information.

It is another object of the present invention to provide a telecommunication access device for displaying directory information, such as telephone numbers, electronic addresses, and other access information, and for initiating a electronic communication, such as a telephone call, a network communication, an e-mail communication, a teleconferencing communication or the like, pursuant to such directory information.

It is a further object of the present invention to provide apparatus for storing and accessing a large amount of directory information without requiring a user to memorize additional information in order to access such directory information.

It is a still further object of the present invention to provide apparatus that stores and accesses a large amount of directory information and that has a simplified physical structure and an intuitive graphical user interface.

In accordance with an aspect of the present invention, a communication terminal apparatus is provided. The apparatus includes an access information receiving device for receiving access information and a video information receiving device for receiving video information corresponding to the access information. A storage device stores the access information and the video information. A video information retrieval device retrieves from the storage device the video information for display to a user. A selection device receives from the user a selection of one video information and an access information retrieval device retrieves from the storage device one access information corresponding to the one video information.

In accordance with another aspect of the present invention, a method of communication is provided. The method includes the steps of: receiving access information; receiving video information corresponding to the access information; and storing in a storage device the access information and the video information. The method also includes the steps of: retrieving from the storage device the video information for display to a user; receiving from the user a selection of one video information; and retrieving from the storage device one access information corresponding to the one video information.

Other objects, features, and advantages according to the present invention will become apparent from the following detailed description of illustrated embodiments when read in conjunction with the accompanying drawings in which the same components are identified by the same reference numerals.

DETAILED DESCRIPTION OF THE PREFERRED EMBODIMENTS

Figure 1:
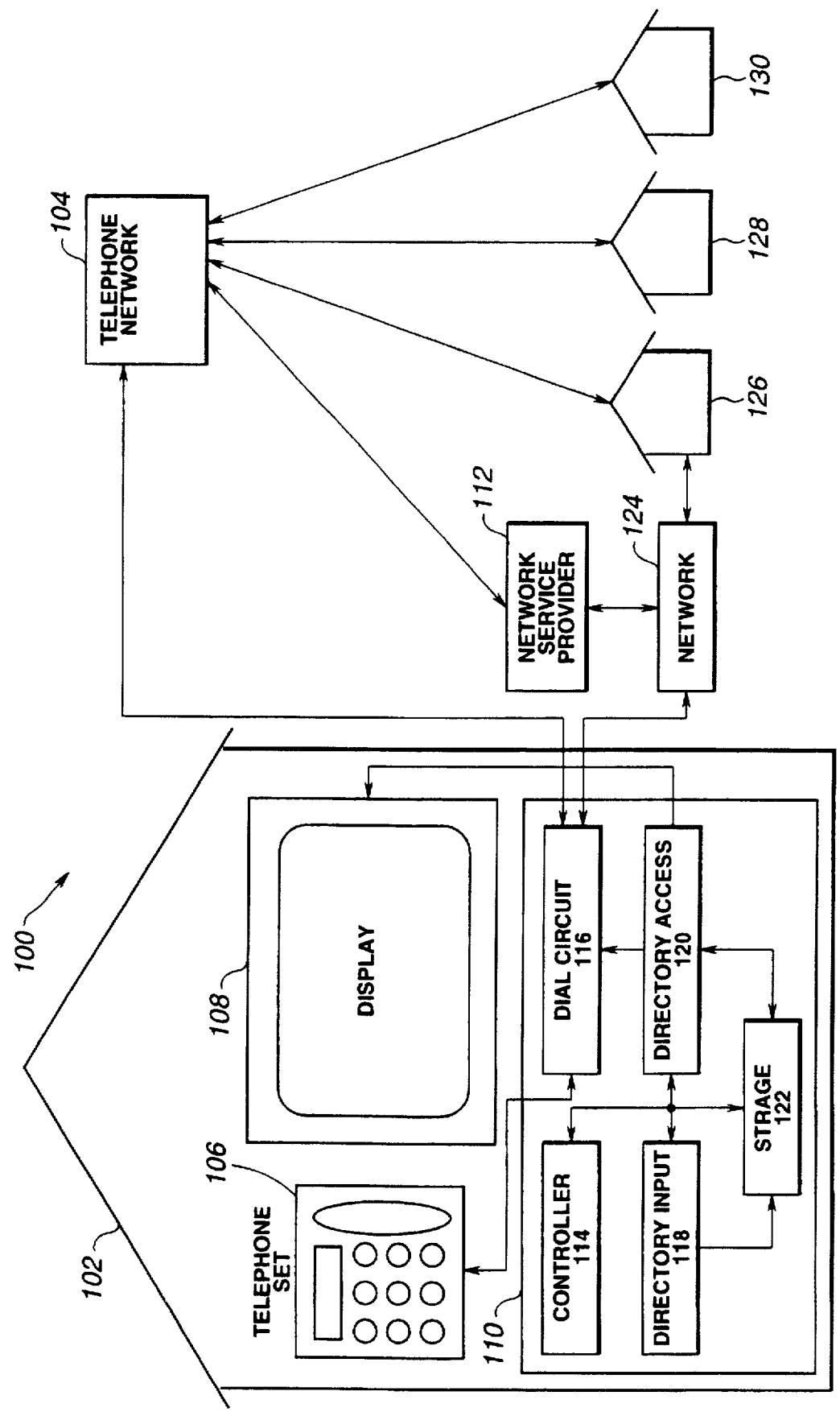
FIG. 1 is a block diagram of a communication system.

FIG. 1 illustrates a communication system 100 incorporating a communication terminal 110 according to the present invention. Communication system 100 is adapted for the transmission of communications among user locations and communication networks. Such communications may include speech, audio signals, video signals, digital data, and the like.

Communication system 100 includes user locations 102, 126, 128, and 130; a telephone network 104, a network service provider 112, and a network 124. Each of user locations 102, 126, 128, and 130 is connected to telephone network 104, a conventional telephone network which includes switching for connecting certain user locations with other user locations. Telephone network 104 may, of course, be connected to plural telephone networks, other types of networks, network service providers, and user locations. User locations 102 and 126 are specifically shown connected directly to network 124.

Network 124 is a conventional communications network, such as the Internet, a local area network, an intranet, a computer network, another telephone network, and the like, for the transmission of communications and may be connected to other networks and users. Network 124 may be comprised of plural networks accessible through a network service provider or a telephone network and/or accessible directly from a user location. Network service provider 112 is connected between telephone network 104 and network 124 to facilitate the transmission of communications between the two networks.

Located at user location 102 are a telephone set 106, a display 108 and a communication terminal 110. Telephone set 106 may comprise a telephone device for speech communication, a video conferencing device for the transmission of video and audio information, or the like. Display 108 is preferably a video display device, such as a television, a computer monitor, or the like, for displaying video images and, optionally, for reproducing audio signals.

Communication terminal 110 includes a controller 114, a dial circuit 116, a directory input device 118, a directory access device 120, and a storage device 122. A detailed description of the components of terminal 110 is provided below in conjunction with the discussion of FIG. 2.

In a telephone system communication initiated at user location 102, communication terminal 110 transmits telephone dialing signals to telephone network 104. In response, telephone network 104 couples user location 102 with one or more other user locations, such as user locations 126, 128, and 130, or with network service provider 112. Information is transmitted from user location 102 through telephone network 104 to network service provider 112 or to one of user locations 126, 128, and 130. Network service provider 112 may forward transmitted information to network 124 which, in turn, may forward transmitted information. Return transmissions from network service provider 112, network 124, or one of user locations 126, 128, and 130 may be received at user location 102.

Alternatively, a direct network communication may be initiated from user location 102. Communication terminal 110 transmits telephone dialing signals or other access information to network 124. Network 124 may forward transmitted information to network service provider 112, to user location 126, or to like destinations. Return transmissions from network 124 or transmitted through network 124 may be received at user location 102.

Figure 2:
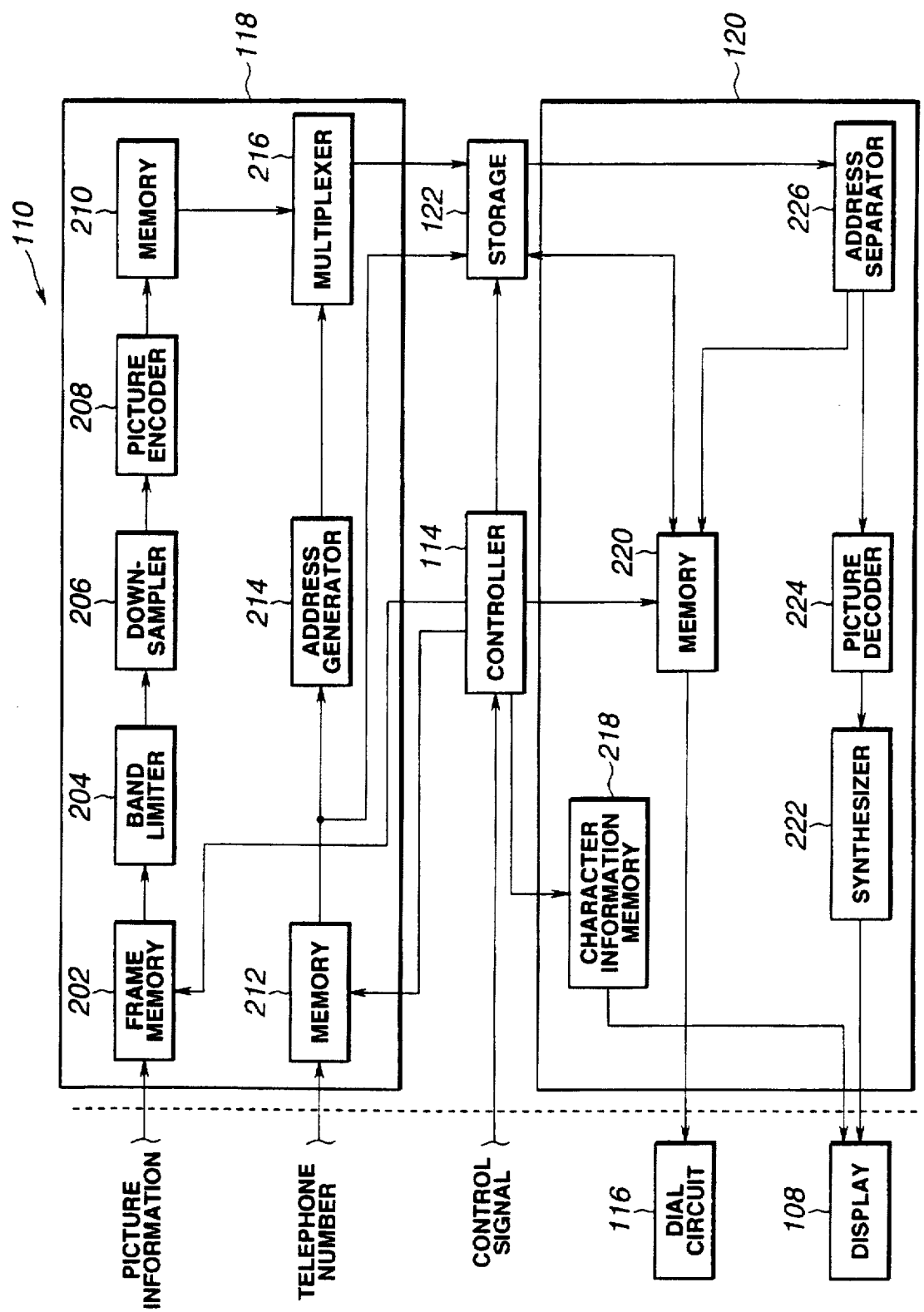
FIG. 2 is a block diagram of a communication terminal.

FIG. 2 illustrates a preferred embodiment of communication terminal 110. Communication terminal 110 includes a controller 114, a dial circuit 116, a directory input device 118, a directory access device 120, and a storage device 122. Directory input device 118 writes access information, such as telephone numbers and e-mail addresses, into storage device 122, along with corresponding video information. The access information may be augmented with additional access information to facilitate communication through a network or a network service provider or to accommodate password information. The video information may include any representation of visual information, including picture information, computer generated image information, video signals, and the like.

Storage device 122 stores the access information and corresponding video information. Directory access device 120 accesses stored access information and corresponding stored video information for supply to display 108 and dial circuit 116. Display 108 is operable to display video information and access information supplied from storage device 122. Directory input device 118, directory access device 120, and storage device 122 are controlled by controller 114. Dial circuit 116 transmits to a network signals corresponding to access information received from directory access 120.

Directory input device 118 comprises frame memory 202, band limiter 204, down-sampler 206, picture encoder 208, picture memory 210, access information memory 212, address generator 214, and multiplexer 216. Band limiter 204 is a bandwidth limiter for removing high frequency components from video information and preferably comprises a low-pass filter. Band limiter 204 operates to limit the bandwidth of the video information to prevent aliasing distortion from appearing in the displayed video information.

Down-sampler 206 is preferably a decimator for decimating pixels of bandwidth-limited video information. Picture encoder 208 encodes video information according to a compression algorithm. Preferably, picture encoder 208 implements video compression according to the JPEG standard system derived from the discrete cosine transform. The compression ratio may be determined as a function of the storage capacity of storage device 122 and of the maximum amount of access information which is to be accommodated by communication terminal 110. Access information memory 212 is a memory device, such as a semiconductor memory, for storing access information, such as a telephone number, an e-mail address, or the like.

Address generator 214 generates and temporarily stores address information which represents an address of a storage area in storage device 122 for each access information. Multiplexer 216 multiplexes video information and address information. Frame memory 202 and picture memory 210 each comprise a video signal storage device, such as a semiconductor memory, for storing video signals representing a single image or multiple images. Optionally, corresponding audio signals are stored in memory 202 and memory 210.

Figure 4A:
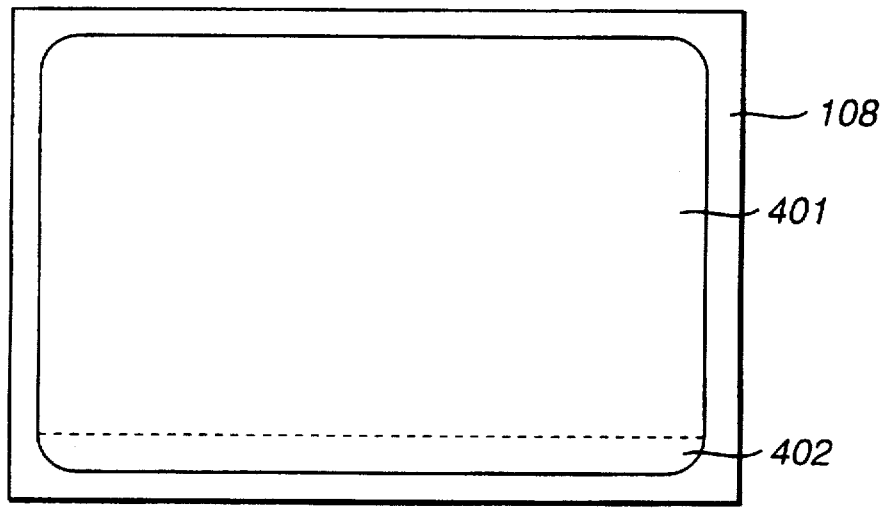
FIGS. 4A, 4B, and 4C are display layouts.
Figure 4B:
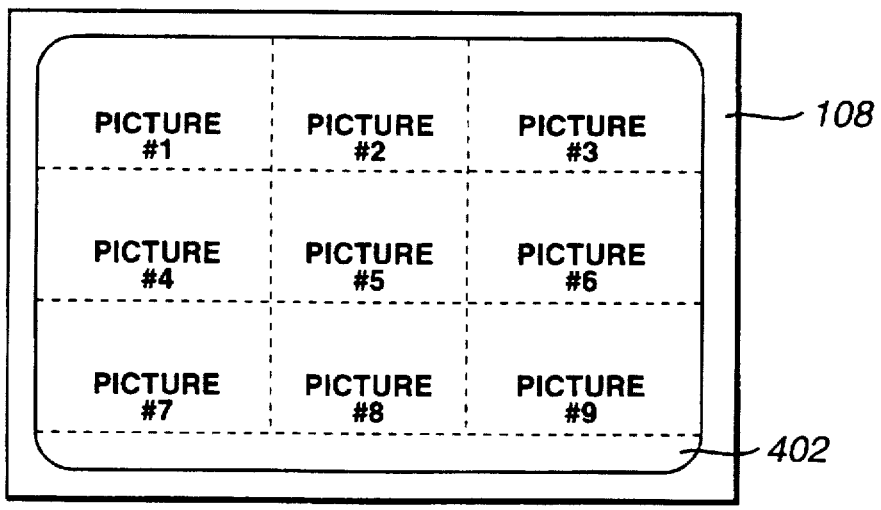
Figures 4C, 5:
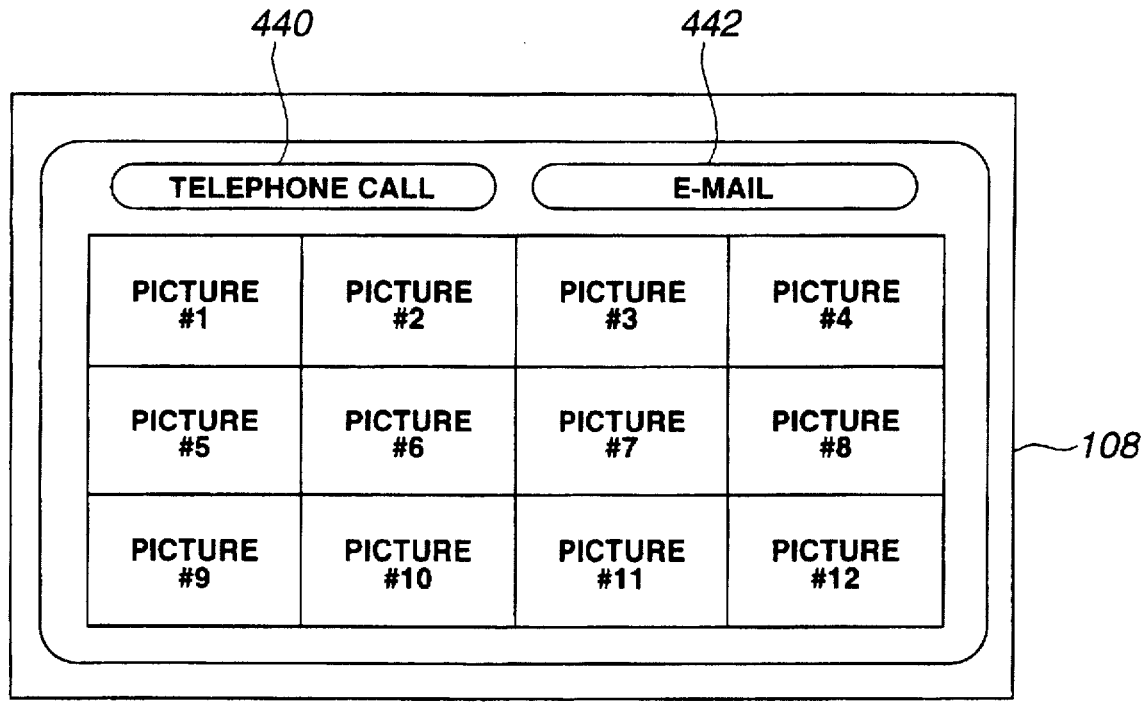
FIG. 5 is a format for storage of access information and video information.

Picture information, along with address information temporarily stored in address generator 214, is multiplexed by multiplexer 216 for storage in storage device 122. Storage device 122 stores access information, address information, and video information and may comprise a semiconductor memory, a magnetic disc, a magneto-optical disc, a magnetic tape, and the like. FIG. 5 illustrates a sample format for data storage within storage device 122. As indicated by the row structure of the sample format, video information representing images is stored and is associated with one or more pieces of stored access information, such as a name, a telephone number, an e-mail address, and the like.

Directory access device 120 comprises character information memory 218, access information memory 220, synthesizer 222, picture decoder 224, and address separator 226. Character information memory 218 is a storage device, such as a semiconductor memory, for storing character information that constitute a message for a user. Such character information may include messages prompting a user for input to control operation of communication terminal 110. Character information may be displayed in each step of the process of storing and retrieving access information.

Access information memory 220 is a storage device, such as a semiconductor memory, for temporary storage of address information and access information. Memory 220 supplies access information to dial circuit 116. Synthesizer 222 stores decoded video information and synthesizes a number of different video images. Preferably, synthesizer 222 synthesizes 9 video images or 12 video images in a grid pattern as shown in FIGS. 4B and 4C, respectively. Video information synthesized by synthesizer 222 is supplied to display 108 for display in conjunction with character information as shown in FIGS. 4A, 4B, and 4C. Picture decoder 224 decodes encoded video information.

Address separator 226 retrieves multiplexed video information and address information from storage device 122 and separates the address information from the video information. Address separator 226 supplies the address information to memory 220 and supplies the video information to picture decoder 224.

Display 108 comprises a display device, such as a television, a computer monitor, a CRT, or the like, for displaying video information to a user. Optionally, display 108 may also output sound.

Dial circuit 116 comprises a conventional network access device, such as a telephone dialing circuit, a modem, and the like. Dial circuit 116 generates calling signals, such as telephone dialing signals, corresponding to access information supplied from access information memory 220. The calling signals are supplied to networks.

Controller 114 is a control unit for controlling the operation of communication terminal 110. Controller 114 may comprise a CPU and, more specifically, may include a microprocessor.

Optionally, each of the storage devices and memories described hereinabove may comprise a semiconductor memory, a magnetic disc, a magneto-optical disc, a magnetic tape, or like storage media.

Figure 3:
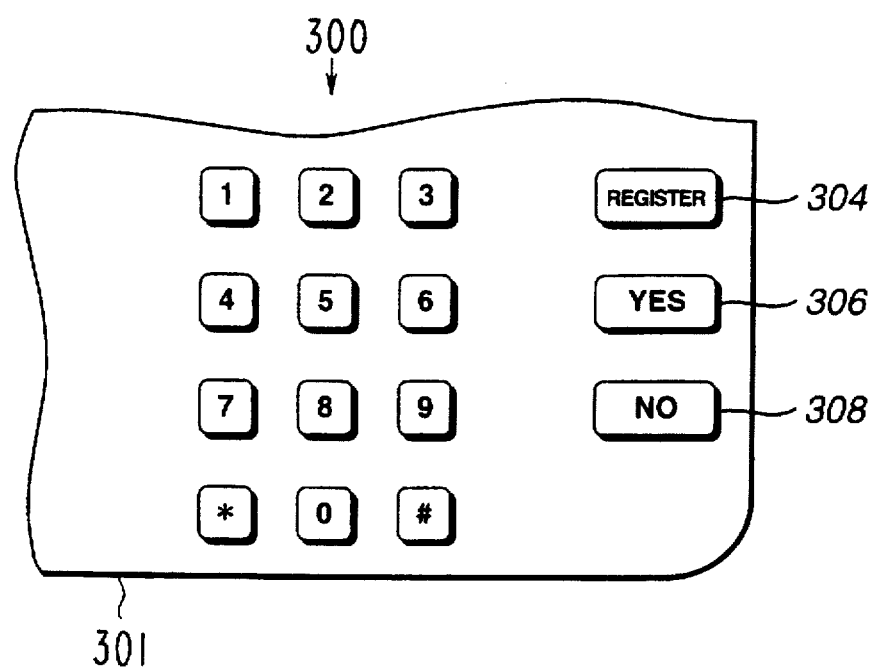
FIG. 3 is a user input device.

FIG. 3 illustrates user input device 300 for receiving user input and generating corresponding control signals. User input device 300 may comprise a remote control device, or be provided on an outer portion of communication terminal 110. User input device 300 includes a keypad 301 and control keys 304, 306, and 308. In response to actuation of keypad 301, which of course may have any number of keys, or control keys 304, 306, and 308, user input device 300 generates control signals which are supplied to controller 114. As shown, control keys 304, 306, and 308 are labeled "register", "yes", and "no", respectively. Optionally, additional or fewer control keys may be provided.

FIGS. 4A, 4B, and 4C illustrate sample displays generated by communication terminal 110 for display to a user on display 108. Character information supplied by character information memory 218 may be displayed in a display area 402, as shown in FIGS. 4A and 4B, or in multiple display areas 440 and 442, as shown in FIG. 4C. Although specific embodiments of display areas have been illustrated to assist in explanation of the invention, such areas may be located at any position within the display area of display 108.

Figure 6:
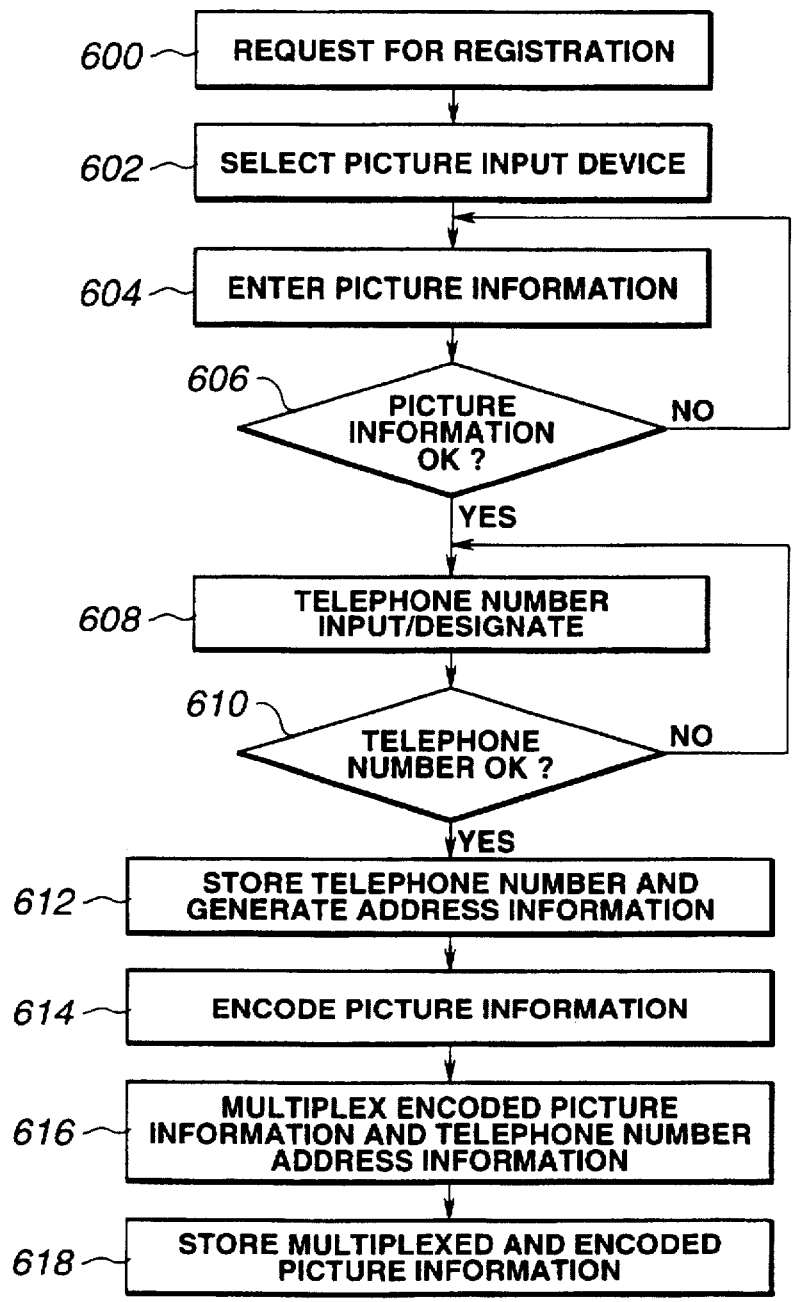
FIG. 6 is a flow chart of a directory information registration operation.

Operation of communication terminal 110 is further explained below in conjunction with the flow charts of FIGS. 6 and 7. FIG. 6 illustrates a preferred process for directory information registration by which access information and video information are input by a user and stored by communication terminal 110. Of course, if no video information is input by the user, a temporary image may be generated by communication terminal 110 and associated with entered access information or no image may be associated with the entered access information. Communication terminal 110 need not be connected to a network during a directory information registration operation.

In step 600, a user enters a command into user input device 300 to request registration, e.g. input, of certain access information. In a preferred embodiment, such a command is entered by activation of control key 304. In response to the user's command, user input device 300 generates and supplies a control signal to controller 114 indicating that the registration operation has been selected. The process proceeds with step 602.

In step 602, the user selects a picture input device (not shown) from which video signals representing an image or a number of images will be supplied. Such selection process may be facilitated by controller 114 by controlling character information memory 218 to supply selection prompting messages to display 108 for display to the user.

A picture input device may include, for example, a video camera, a storage medium, a scanner, an electronic still camera, and the like. The storage medium may comprise any medium which stores video information, including a magnetic disc, an optical disc, a magnetic tape, and the like. Alternatively, if communication terminal 110 is connected to a network, such as telephone network 104, such network may be selected by the user as the picture input device. A switching device (not shown) may be connected to communication terminal 110 to facilitate connection with a particular input device.

Optionally, a user input device may be selected as a picture input device. A user input device, such as user input device 300, may generate character information which may be stored as video information.

In step 604, video information from an input device is entered into communication terminal 110 for display on display 108 to the user. Preferably, such video information is displayed in a relatively large display area, such as display area 401 illustrated in FIG. 4A. Optionally, the video signals may be displayed in a single frame mode. Processing proceeds with step 606.

In step 606, a user determines whether the displayed video information is desired for association with certain access information and supplies an appropriate indication to controller 114 through user input device 300. Prompting messages from character information memory 218 may be displayed via display 108, preferably in display area 402. If the displayed video information is not desired by the user, the user enters a negative response into user input device 300. Such user input may comprise activation of control key 308. If the user enters a negative response, processing proceeds with step 604 and another video information is displayed.

If the displayed video information is desired by the user, the user enters a positive response into user input device 300. Such user input may comprise activation of control key 306. If the user enters a positive response, the displayed video information is temporarily stored in frame memory 202 and processing proceeds with step 608.

In step 608, access information is input into communication terminal 110 by a user or from an input device or from a network. The user may enter the access information through user input device 300. Preferably, the user utilizes keypad 302. Alternatively, the access information may be supplied by the input device from which the video information selected by the user was obtained. As a further alternative, access information regarding a prior or current communication transmitted by or received by communication terminal 110 and retained in a memory (not shown) may be supplied to communication terminal 110. As another alternative, access information may be received from a network connected to communication terminal 110, stored in a memory (not shown), and supplied to access information memory 212. This last alternative would include the reception of caller identification information from certain telephone network systems.

Communication terminal 110 displays the entered access information to the user on display 108 and processing proceeds with step 610. Prompting messages from character information memory 218 may be displayed via display 108, preferably in display area 402. In step 610, if the displayed video information is not desired by the user, the user enters a negative response into user input device 300. Such user input may comprise activation of control key 308. If the user enters a negative response, processing proceeds with step 608 and another access information is displayed.

If the displayed access information is desired by the user, the user enters a positive response into user input device 300. Such user input may comprise activation of control key 306. If the user enters a positive response, the displayed access information is temporarily stored in access information memory 212 in step 612. Further, address generator 214 generates and temporarily stores an address of a storage area in storage device 122 corresponding to the selected access information. The selected access information is stored in storage device 122 in the storage area corresponding to the generated address.

In the following step 614, if video information has been supplied to frame memory 202, the video information is retrieved by band limiter 204 for bandwidth limiting. The bandwidth-limited signal is down-sampled by down sampler 206. The video information is down-sampled to reduce the amount of storage capacity needed to store the video information and to facilitate display of multiple video information in a single display area 401 in a minimal amount of time. If, as in the preferred embodiment illustrated in FIG. 4B, nine items of video information, each an image or multiple images, are to be displayed simultaneously (indicated in FIG. 4B as picture #1, #2, ... #9), down sampler 206 down samples the video information by a factor of nine. By this process, one-ninth of the original video information remains for encoding by picture encoder 208. Picture encoder 208 encodes the down-sampled video information and supplies the encoded video information to picture memory 210.

In an alternative embodiment of the present invention, directory input device 118 receives encoded video information from the picture input device. Accordingly, band limiter 204, down-sampler 206, and picture encoder 208 may be omitted from directory input device 118 in such an embodiment.

Encoded video information is temporarily stored in picture memory 210. Processing continues with step 616.

In step 616, encoded video information from picture memory 210 and address information from address generator 214 are transferred to multiplexer 216. The encoded video information and the address information are multiplexed to produce a multiplexed information and, in step 618, the multiplexed information is stored in storage device 122. By multiplexing the address of the access information corresponding to the video information with the video information instead of multiplexing the access information itself with the video information, error in the multiplexing and demultiplexing process is prevented from corrupting the access information.

Figure 7:
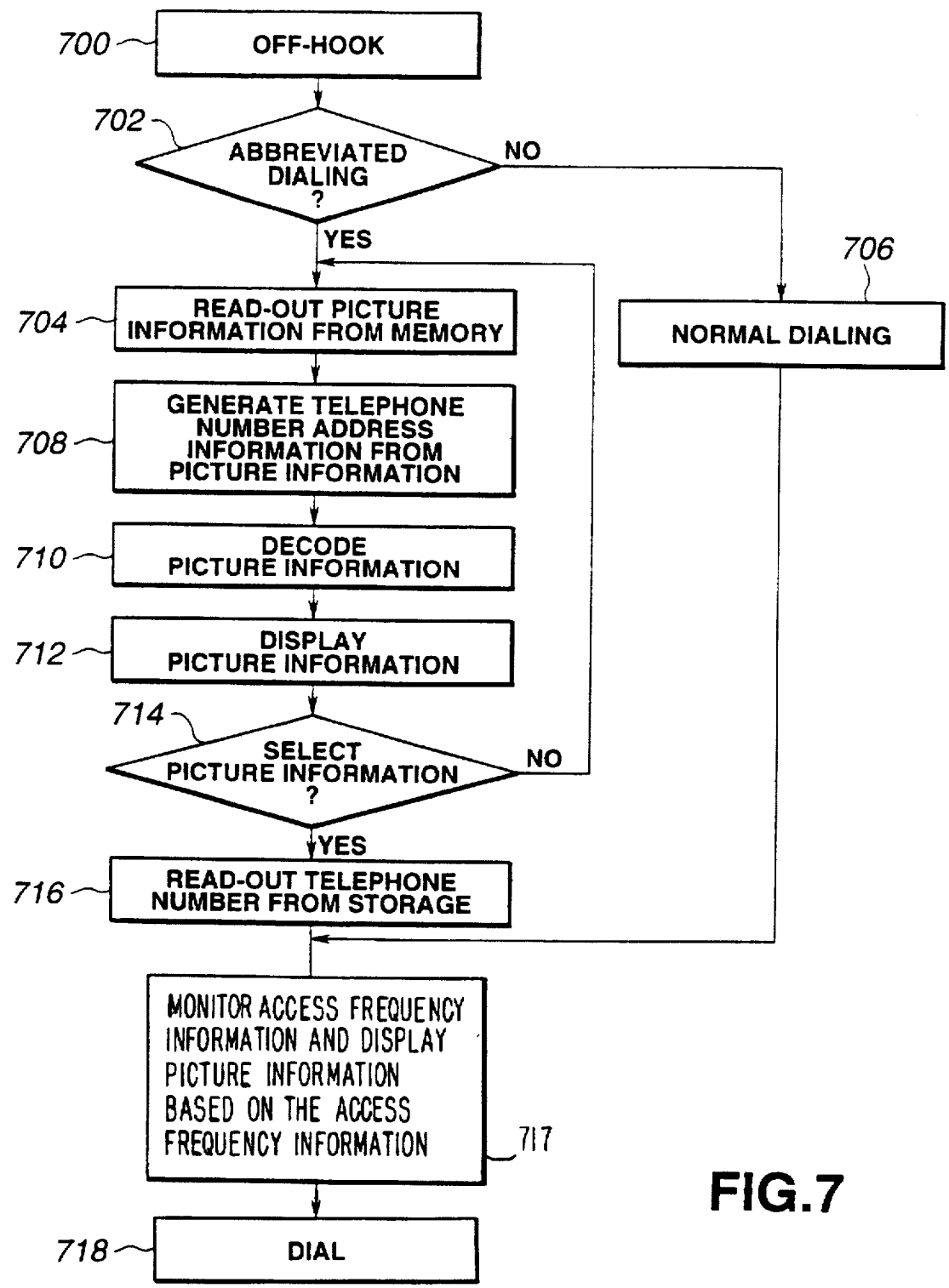
FIG. 7 is a flow chart of a directory information access operation.

FIG. 7 illustrates a preferred process for directory information access by which access information and video information are retrieved from storage and displayed to a user. Upon user selection of certain video information, communication terminal 110 accesses and transmits corresponding access information.

In step 700, the directory information access commences with an off-hook operation at the communication terminal. Optionally, step 700 may be omitted. Processing continues with step 702.

In step 702, prompting messages from character information memory 218 are displayed via display 108, preferably in display area 402. The prompting messages query a user if a directory display operation is desired. The user supplies an appropriate indication to controller 114 through user input device 300. If a directory display operation is not desired by the user, the user enters a negative response into user input device 300. Such user input may comprise activation of control key 308 or activation of keypad 302 to input access information. If the user enters a negative response, processing proceeds with step 706.

In step 706, the user enters access information by an ordinary method and processing proceeds with step 718.

If a directory display operation is desired by the user, the user enters a positive response into user input device 300.

Such user input may comprise activation of control key 306. If the user enters a positive response, processing proceeds with step 704.

In step 704, multiplexed information is retrieved from storage device 122 and supplied to address separator 226. The multiplexed information may include multiple different items of video information. Preferably, multiplexed information that includes nine different items of video information are retrieved.

In succeeding step 708, address separator 226 separates address information from the multiplexed information and supplies the address information to access information memory 220 for temporary storage. Address separator 226 also separates each item of video information from the multiplexed information and supplies each item of video information to picture decoder 224. Processing proceeds with step 710.

In step 710, each item of video information is decoded by picture decoder 224 and each decoded item of video information is supplied to synthesizer 222. Synthesizer 222 determines a screen location for each item of decoded video information and synthesizes a display of the item(s) of decoded video information. Processing proceeds with step 712.

In step 712, the synthesized display of decoded video information is displayed to the user via display device 108. Preferably, nine items of video information are displayed simultaneously, as illustrated in FIG. 4B. Character information from character information memory 218 may also be displayed. Preferably, such character information is provided in display area 402. Alternatively, twelve items of video information are displayed simultaneously, as illustrated in FIG. 4C. Character information from character information memory 218 may also be displayed in multiple display areas, such as display areas 440 and 442. Of course, any number of items of video information may be displayed. Processing proceeds with step 714.

In step 714, the user may choose to select one of the displayed items of video information corresponding to access information that the user desires to utilize or choose to have other items of video information displayed. The user's choice is entered into input device 300.

If the user desires that other items of video information be displayed, the user activates a control key, such as control key 308, to indicate that the current display of video information is to be replaced with a display of different video information. In this case, processing proceeds with step 704 and other item(s) of video information are retrieved from storage device 122.

If the user selects one of the currently displayed items of video information, the user preferably utilizes keypad 302 to indicate the particular item of video information selected. As an example, where nine or twelve items of video information are displayed, as illustrated in FIGS. 4B and 4C, respectively, activation of a key in keypad 302 may indicate a selection of an item of video information having a position in the synthesized display corresponding to the position of the activated key in keypad 302. According to this example, activation of the upper left key (1 key) would indicate a selection of the video information displayed in the upper left corner of the display (picture #1). Alternatively, a pointing device, such as a mouse, may be directed by the user to control a cursor provided on display 108 to indicate the user's selection of a particular item of video information. Following selection of a particular item of video information, processing proceeds with step 716.

In step 716, address information corresponding to the selected item of video information is utilized to retrieve corresponding access information from storage device 122. The corresponding access information is supplied to access information memory 220. Access information memory 220 forwards the retrieved access information to dial circuit 116. Processing proceeds with step 718.

In step 718, dialing circuit 116 generates and transmits calling signals corresponding to the retrieved access information to a network.

In an alternate embodiment of communication terminal 110, address generator 214 is omitted, and operation is altered in that access information and video information are directly multiplexed by multiplexer 216. Accordingly, in the flow diagram of FIG. 6, step 612 may be omitted and step 616 altered such that encoded video information and access information are multiplexed. Further, in the flow diagram of FIG. 7, steps 708 and 716 may be omitted and step 704 altered such that encoded video information and corresponding access information are retrieved from storage device 122.

In another alternate embodiment of communication terminal 110, only one item of video information is displayed at a time on screen 108 during the process of directory information access illustrated in FIG. 7. Consequently, band limiter 204 and down-sampler 206 are omitted and synthesizer 222 is replaced with a frame memory.

In yet another alternate embodiment of communication terminal 110, a character display device (not shown) for separately displaying character information is provided. The character display device may comprise a dedicated liquid crystal display (LCD). Accordingly, synthesizer 222 may be omitted and character information memory 218 coupled to the character display device. In such an embodiment, character information is not displayed on display 108.

In still another embodiment of communication terminal 110, an access frequency device is included for monitoring the actual frequency with which each access information is utilized for a communication process. As a function of the monitored access frequency, controller 114 controls the sequence of display of items of video information as shown in step 717 of FIG. 7. The access frequency information may be stored in storage device 122. Preferably, controller 114 controls the accessing of directory information by directory access device 120 such that items of video information are displayed in the order of decreasing access frequency of the corresponding access information, e.g. items of video information corresponding to the most frequently utilized access information are displayed first. Such ordering of video information has the advantage of enabling a user to access the most frequently utilized access information in the shortest amount of time.

In another embodiment of communication terminal 110, the encoding methodology implemented in picture encoder 208 and the corresponding decoding methodology implemented in picture decoder 224 are modified to be compatible with picture encoding and decoding functions implemented in telephone set 106. Alternatively, picture encoder 208 and picture decoder 224 are implemented entirely in telephone set 106.

In another embodiment of communication terminal 110, storage device 122 is implemented in telephone set 106 and simultaneously stores access information and corresponding video information. Alternatively, storage device 122 is implemented in a separate device distinct from communication terminal 110.

In yet another embodiment of communication terminal 110, an alphabetical keyboard may be substituted for input device 300. Communication terminal 110 may be implemented in a personal computer device. The functionality of communication terminal 110 may be duplicated in a computer device with a combination of hardware and software-controlled devices. Display layouts specifically designed for use in conjunction with electronic mail and a computer are illustrated in FIGS. 8 and 9.

Figure 8:
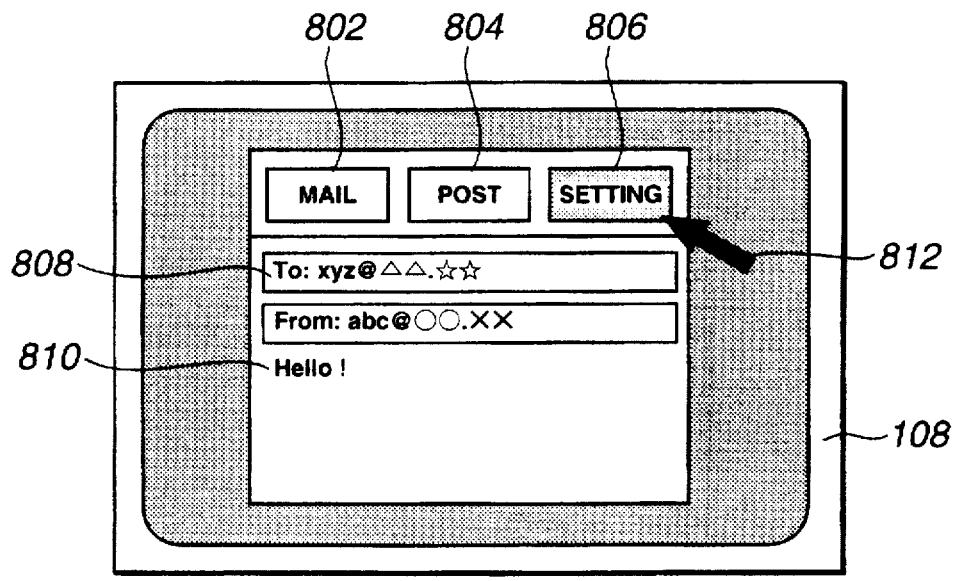
FIG. 8 is a display layout.
Figure 9:
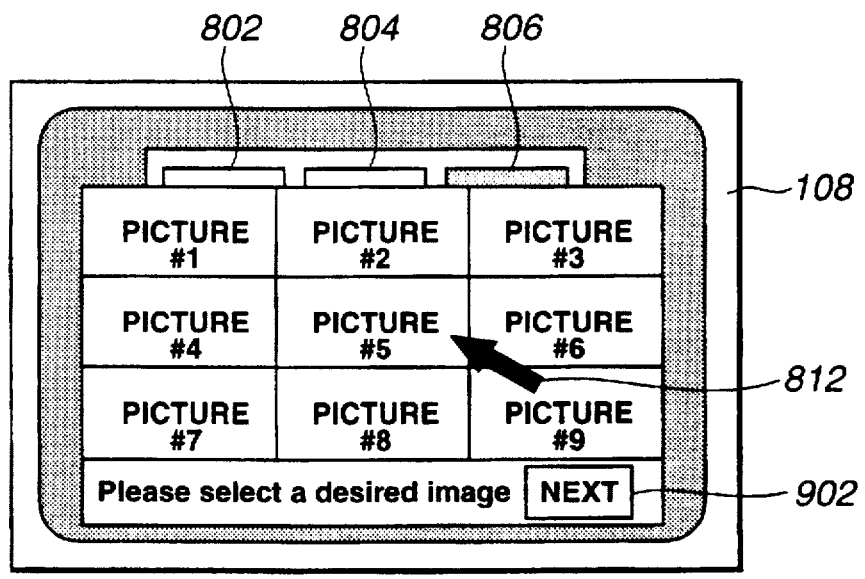
FIG. 9 is a display layout.

In FIG. 8, three character display areas 802, 804, and 806 are provided, along with access information area 808, and message area 810. Each of the character display areas may be activated with cursor 812 to initiate a corresponding operation of communication terminal 110. A directory information registration operation may be initiated by activating display area 806, labeled "setting".

A directory information access operation may be initiated by activating display area 802, labeled "mail". Upon selection of a particular video information, the corresponding access information, e.g. e-mail address, is displayed in access information area 808. The user enters message information in message area 810. The e-mail communication is sent by communication terminal 110 in response to the user's activation of display area 804, labeled "post".

If a desired video information is not initially displayed in display 108, a user may choose to have other items of video information displayed (step 714). As illustrated in FIG. 9, a character display area 902, labeled "next", may be provided in a display. A user's activation of display area 902 with cursor 812 indicates that the current display of video information is to be replaced with a display of different video information. In this case, processing proceeds with step 704 and other item(s) of video information are retrieved from storage device 122.

In another embodiment of communication terminal 110, a user may also select among different types of access information during a directory information registration operation or a directory information access operation. As illustrated in FIG. 4C, a number of display areas, such as display areas 440 and 442, may be provided to list the types of access information which may be stored or retrieved. By activating a display area with a cursor, or supplying corresponding input into user input device 300, a user may select a particular type of access information for further processing according to the directory information registration operation or directory information access operation described hereinabove.

As an example of a directory information access operation, if display area 440, labeled "telephone call", is activated and a particular video information selected, controller 114 controls communication terminal 110 to access corresponding telephone number information for dialing. In contrast, if display area 442, labeled "e-mail", is activated and a particular video information selected, controller 114 controls communication terminal 110 to access corresponding e-mail address information for dialing.

Although illustrative embodiments of the present invention and modifications thereof have been described in detail herein, it is to be understood that this invention is not limited to these precise embodiments and modifications, and that other modifications and variations may be effected therein by one skilled in the art without departing from the scope and spirit of the invention as defined by the appended claims.

What is claimed is:

1. A communication terminal apparatus comprising:
    access information receiving means for receiving a plurality of access information;
    video information receiving means for receiving a plurality of video information corresponding to said plurality of access information;
    bandwidth limiting means for bandwidth limiting said plurality of video information;
    down sampling means for down sampling the bandwidth limited plurality of video information;
    storage means for storing said plurality of access information and for storing the bandwidth limited plurality of video information;
    video information retrieval means for retrieving from said storage means the bandwidth limited plurality of video information for display to a user;
    a display device, coupled to said video information retrieval means, for displaying to the user the retrieved plurality of video information simultaneously, said plurality of video information being comprised of a number of video images such that said down sampling means down samples said plurality of video information by a factor equal to said number of video images to facilitate a display of the retrieved plurality of video information;
    selection means for receiving from the user a selection of one of the retrieved plurality of video information; and
    access information retrieval means for retrieving from said storage means one of said plurality of access information corresponding to said one of the selected plurality of video information.

2. The apparatus according to claim 1, further comprising access information selection means for receiving from the user a selection of one of a plurality of access information types.

3. The apparatus according to claim 2, wherein said plurality of access information types comprise a telephone number type and an e-mail address type.

4. The apparatus according to claim 1, wherein said display device comprises a television.

5. The apparatus according to claim 1, wherein said display device comprises a computer monitor.

6. The apparatus according to claim 1, wherein said plurality of access information comprises a plurality of telephone numbers.

7. The apparatus according to claim 1, wherein said plurality of access information comprises a plurality of e-mail addresses.

8. The apparatus according to claim 1, further comprising encoding means for encoding said plurality of video information.

9. The apparatus according to claim 1, wherein each of said plurality of video information comprises a sequence of images.

10. The apparatus according to claim 1, wherein said plurality of video information comprises a plurality of character information.

11. The apparatus according to claim 1, wherein said selection means comprises means for receiving from the user a selection of a video image corresponding to a communication recipient.

12. The apparatus according to claim 1, wherein said selection means comprises means for receiving from the user a selection of a video image corresponding to a network.

13. The apparatus according to claim 1, wherein said selection means comprises means for receiving from the user a selection of a video image corresponding to a network service provider.

14. The apparatus according to claim 1, further comprising a calling means for generating a plurality of calling signals as a function of said one of said plurality of access information.

15. The apparatus according to claim 14, wherein said calling means comprises a dialing circuit.

16. The apparatus according to claim 1, wherein said access information receiving means comprises means for receiving an access information from a received communication.

17. The apparatus according to claim 1, wherein said access information receiving means comprises means for receiving an access information from a transmitted communication.

18. The apparatus according to claim 1, further comprising means for monitoring a frequency of accessing each of said plurality of access information.

19. The apparatus according to claim 18, further comprising ordering means for ordering a display of said plurality of video information according to said frequency.

20. A method of communication comprising the steps of:

receiving a plurality of access information;

receiving a plurality of video information corresponding to said plurality of access information;

bandwidth limiting said plurality of video information;

down sampling the bandwidth limited plurality of video information;

storing in a storage device said plurality of access information and storing the bandwidth limited plurality of video information;

retrieving from said storage device the bandwidth limited plurality of video information for display to a user;

displaying to the user the retrieved plurality of video information simultaneously, said plurality of video information being comprised of a number of video images such that said plurality of video information is down sampled by a factor equal to said number of video images to facilitate a display of the retrieved plurality of video information;

receiving from the user a selection of one of the retrieved plurality of video information; and retrieving from said storage device one of said plurality of access information corresponding to said one of the selected plurality of video information.

21. The method according to claim 20, further comprising the step of monitoring a frequency of accessing each of said plurality of access information.

22. The method according to claim 21, further comprising the step of ordering a display of said plurality of video information according to said frequency.

23. The method according to claim 20, further comprising the step of receiving from the user a selection of one of a plurality of access information types.

24. The method according to claim 23, wherein said plurality of access information types comprise a telephone number type and an e-mail address type.

25. The method according to claim 20, further comprising the step of encoding said plurality of video information.

26. The method according to claim 20, wherein said plurality of access information comprises a plurality of telephone numbers.

27. The method according to claim 20, wherein said plurality of access information comprises a plurality of e-mail addresses.

28. The method according to claim 20, further comprising the step of displaying to the user said plurality of video information simultaneously.

29. The method according to claim 20, wherein each of said plurality of video information comprises a sequence of images.

30. The method according to claim 20, wherein said plurality of video information comprises a plurality of character information.

31. The method according to claim 20, further comprising the step of receiving from the user a selection of a video image corresponding to a communication recipient.

32. The method according to claim 20, further comprising the step of receiving from the user a selection of a video image corresponding to a network.

33. The method according to claim 20, further comprising the step of receiving from the user a selection of a video image corresponding to a network service provider.

34. The method according to claim 20, further comprising the step of generating a plurality of calling signals as a function of said one of said plurality of access information.

35. The method according to claim 20, further comprising the step of receiving an access information from a received communication.

36. The method according to claim 20, further comprising the step of receiving an access information from a transmitted communication.

* * * * *